(12) United States Patent
Mandal et al.

(10) Patent No.: US 9,438,590 B2
(45) Date of Patent: Sep. 6, 2016

(54) PRIVACY PRESERVING BIOMETRIC AUTHENTICATION BASED ON ERROR CORRECTING CODES

(71) Applicant: FUJITSU LIMITED, Kawasaki-shi, Kanagawa (JP)

(72) Inventors: Avradip Mandal, San Jose, CA (US); Arnab Roy, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 60 days.

(21) Appl. No.: 14/286,802

(22) Filed: May 23, 2014

(65) Prior Publication Data

US 2015/0341350 A1    Nov. 26, 2015

(51) Int. Cl.
*H04L 9/32*     (2006.01)
*G06F 21/00*    (2013.01)
*H04L 29/06*    (2006.01)
*G06F 21/32*    (2013.01)

(52) U.S. Cl.
CPC .......... *H04L 63/0861* (2013.01); *G06F 21/32* (2013.01); *G06F 2221/2129* (2013.01); *H04L 9/3231* (2013.01); *H04L 9/3273* (2013.01); *H04L 2209/34* (2013.01)

(58) Field of Classification Search
CPC ... H04L 63/20; H04L 63/102; H04L 9/3231; H04L 9/3273; G06F 21/32; G06F 2221/2129
USPC ......................................... 726/5, 6; 713/186
See application file for complete search history.

(56) References Cited

U.S. PATENT DOCUMENTS

2011/0066859 A1*  3/2011  Iyer .......................... H04L 9/14
                                                         713/176
2013/0174243 A1*  7/2013  Inatomi ................. H04L 9/3231
                                                         726/7

OTHER PUBLICATIONS

Dabbah, M. A., Dlay, S. S., & Woo, W. L. (Apr. 2008). PCA Authentication of Facial Biometric in the Secure Randomized Mapping Domain. In Information and Communication Technologies: From Theory to Applications, 2008. ICTTA 2008. 3rd International Conference on (pp. 1-5). IEEE.

N. K. Ratha, J. H. Connell, and R. M. Bolle, "Enhancing security and privacy in biometrics-based authentication systems," IBM systems Journal, vol. 40, pp. 614-634, 2001.

R. Belguechi, E. Cherrier, C. Rosenberger, and S. Ait-Aoudia, "An integrated framework combining Bio-Hashed minutiae template and PKCS15 compliant card for a better secure management of fingerprint cancelable templates," Elsevier Advanced Technology Publications. Nov. 2013, Computers and Security , vol. 39, Sec, 3.3.

A. Juels and M. Sudan, "A fuzzy vault scheme," IEEE International Symposium on Information Theory, pp. 408, 2002.

(Continued)

*Primary Examiner* — Alexander Lagor
(74) *Attorney, Agent, or Firm* — Maschoff Brennan

(57) ABSTRACT

A method includes transmitting initialization data including an error correction code and a matrix. The method also includes receiving registration data including a transformed registration biometric template, a registration user identifier, and a hashed registration code. The transformed registration biometric template may be determined based on a registration code word selected from the error correction code. The hashed registration code word may be determined by hashing the registration code word using the matrix. The registration user identifier may be associated with a first user described by the transformed registration biometric template.

19 Claims, 7 Drawing Sheets

(56) References Cited

OTHER PUBLICATIONS

Ari Juels and Martin Wattenberg. A fuzzy commitment scheme. In ACM CCS 99, pp. 28-36. ACM Press, Nov. 1999.

Ari Juels and Madhu Sudan. A fuzzy vault scheme. Cryptology ePrint Archive, Report 2002/093, 2002. http://eprint.iacr.org/2002/093.

R. Belguechi, C. Rosenberger, and S. Aoudia, "Biohashing for securing minutiae template," in Proceedings of the 20th International Conference on Pattern Recognition, Washington, DC, USA, 2010, pp. 1168-1171.

Yevgeniy Dodis, Leonid Reyzin, and Adam Smith. Fuzzy extractors: How to generate strong keys from biometrics and other noisy data. In Christian Chachin and Jan Camenisch, editors, EUROCRYPT 2004, vol. 3027 of LNCS, pp. 523-540. Springer, May 2004.

Yevgeniy Dodis and Adam Smith. Correcting errors without leaking partial information. In Harold N. Gabow and Ronald Fagin, editors, 37th ACM STOC, pp. 654{663. ACM Press, May 2005.

P. Paillier, "Public-Key Cryptosystems Based on Composite Degree Residuosity Classes," Advances in Cryptology—EUROCRYPT '99 Lecture Notes in Computer Science vol. 1592, 1999, pp. 223-238. Apr. 15, 1999.

Yasuda, M., Shimoyama, T., Kogure, J., Yokoyama, K., Koshiba, T.: Practical packing method in somewhat homomorphic encryption. In: Data Privacy Management and Autonomous Spontaneous Security. Lecture Notes in Computer Science, pp. 34-50. Springer, Mar. 2014.

C. Gentry, "Fully Homomorphic Encryption Using Ideal Lattices," Proceeding STOC '09 Proceedings of the forty-first annual ACM symposium on Theory of computing pp. 169-178, ACM New York, NY, USA 2009.

S. Dov Gordon, Jonathan Katz, Feng-Hao Liu, Elaine Shi, and Hong-Sheng Zhou. Multi-input functional encryption. Cryptology ePrint Archive, Report 2013/774, 2013. http://eprint.iacr.org/2013/774.

Shafi Goldwasser, Vipul Goyal, Abhishek Jain, and Amit Sahai. Multi-input functional encryption. Cryptology ePrint Archive, Report 2013/727, 2013. http://eprint.iacr.org/2013/727.

Ran Canetti. Towards realizing random oracles: Hash functions that hide all partial information. In Burton S. Kaliski Jr., editor, CRYPTO'97, vol. 1294 of LNCS, pp. 455{469. Springer, Aug. 1997.

Boaz Barak, Yevgeniy Dodis, Hugo Krawczyk, Olivier Pereira, Krzysztof Pietrzak, François-Xavier Standaert, and Yu Yu. Leftover hash lemma, revisited. In Phillip Rogaway, editor, CRYPTO 2011, vol. 6841 of LNCS, pp. 1{20. Springer, Aug. 2011.

Russell Impagliazzo, Leonid A. Levin, and Michael Luby. Pseudo-random generation from one-way functions (extended abstracts). In 21st ACM STOC, pp. 12{24. ACM Press, May 1989.

* cited by examiner

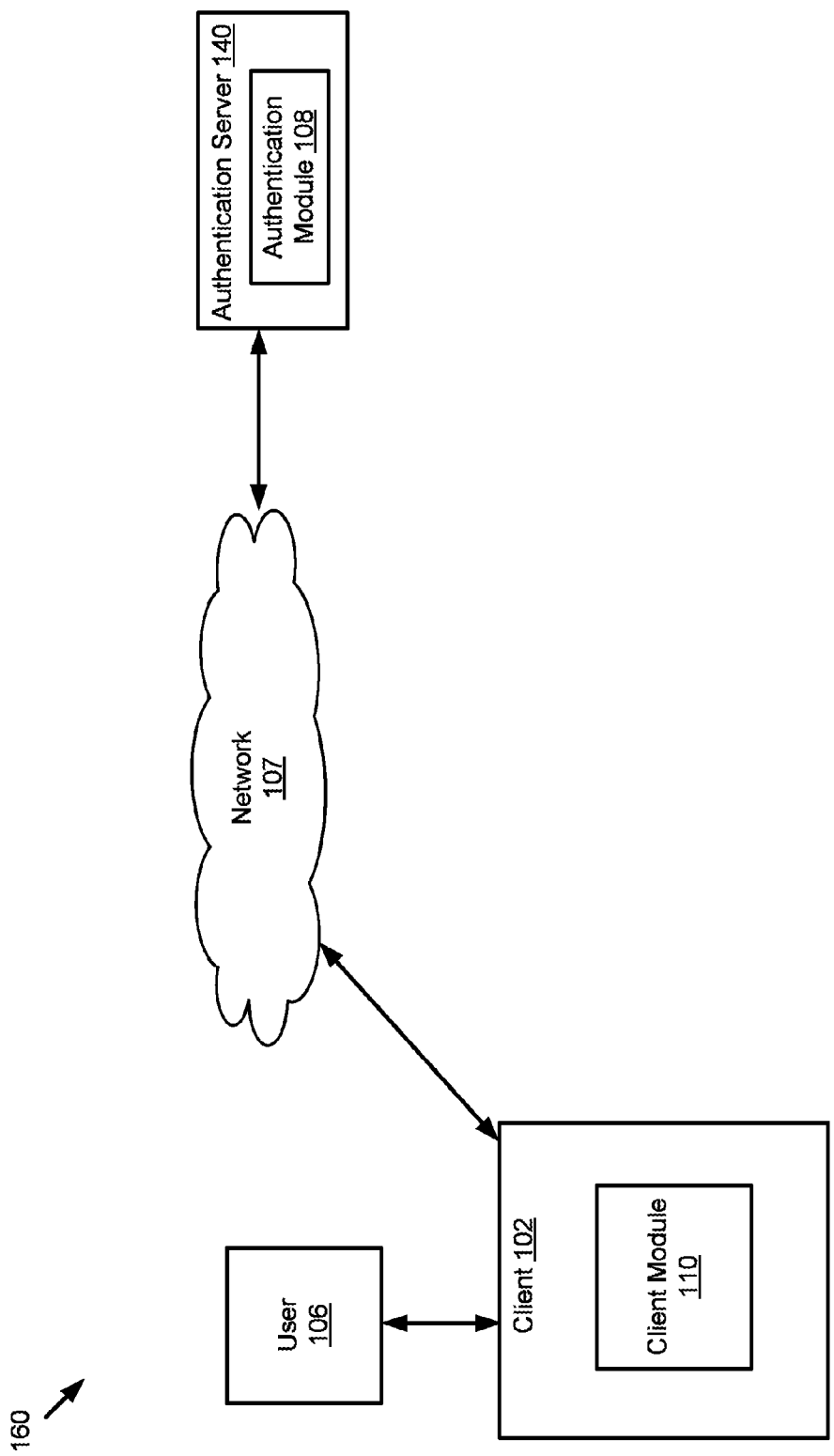

PRIVACY PRESERVING BIOMETRIC AUTHENTICATION BASED ON ERROR CORRECTING CODES

FIELD

The embodiments discussed herein are related to privacy preserving biometric authentication based on error correcting codes.

BACKGROUND

Security may become important for electronic devices and services. As security increases in importance, innovators are looking to new or different forms of authentication. One form of authentication may include biometric authentication. Biometric authentication may include measuring and authenticating a user's identity via a unique biometric characteristic. The unique biometric characteristics may include one or more of a user's fingerprints, iris, veins, DNA, etc. Biometric authentication may have the advantage of allowing users to be authenticated without having to remember a password.

SUMMARY

According to an aspect of an embodiment, a method includes transmitting initialization data including an error correction code and a matrix. The method also includes receiving registration data including one or more of a transformed registration biometric template, a registration user identifier, and a hashed registration code. The transformed registration biometric template may be determined based on a registration code word selected from the error correction code. The hashed registration code word may be determined by hashing the registration code word using the matrix. The registration user identifier may be associated with a first user described by the transformed registration biometric template.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1D is a block diagram of an example operating environment in which a client module or authentication module may be implemented to provide biometric authentication based on error correction codes;

DESCRIPTION OF EMBODIMENTS

Figure 1A:
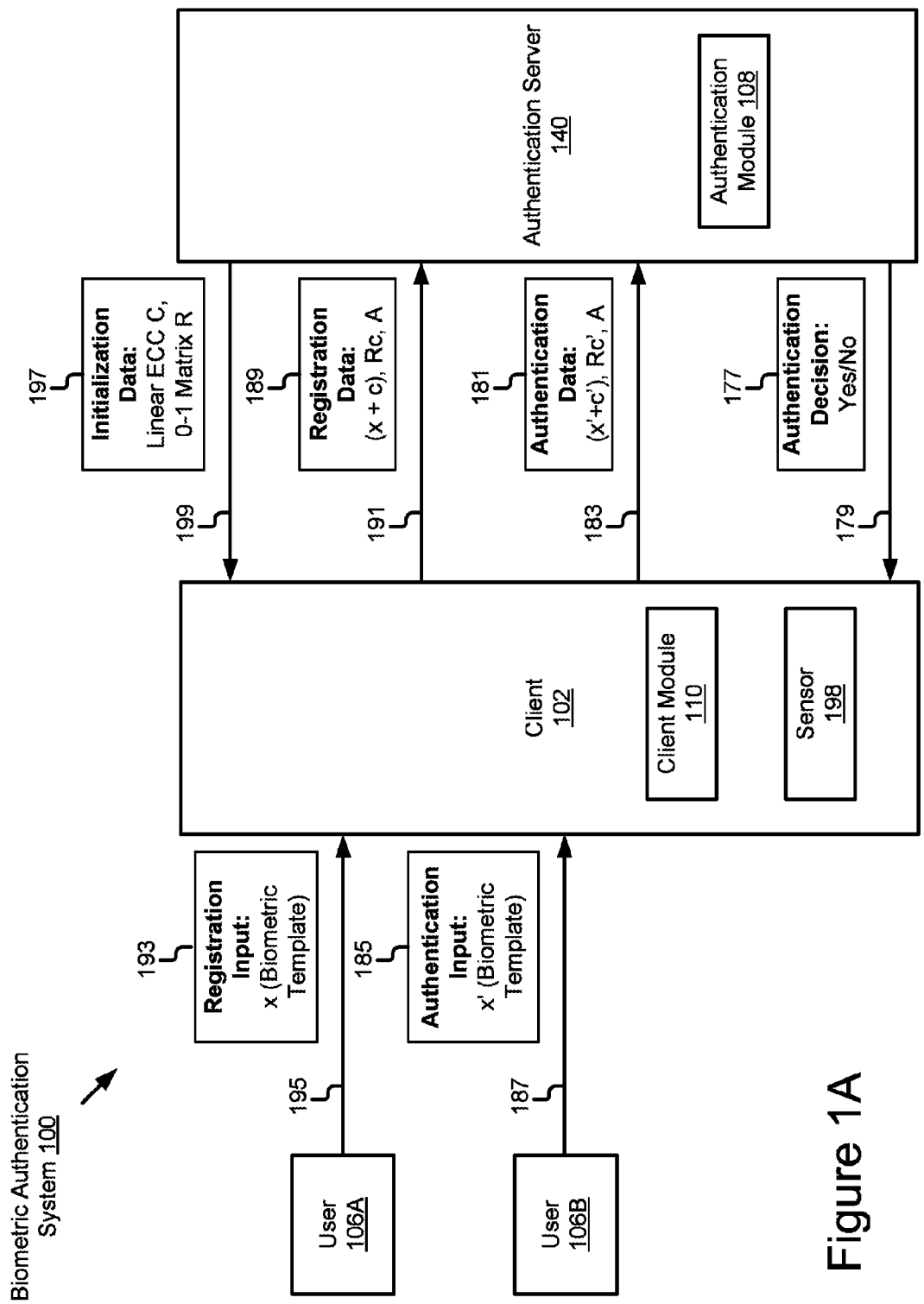
FIG. 1A is a block diagram of an example biometric authentication system.

The embodiments discussed herein are related to providing biometric authentication based on error correcting codes.

In biometric authentication, a user may be unable to change the user's biometric characteristics. For example, a user may register a biometric template including biometric data describing one or more unique characteristics of the user (e.g., fingerprint, iris pattern, etc.). If the biometric template is compromised and if the user is unable to change the unique characteristic described by the biometric template, then biometric authentication may become ineffective for the user. For this reason, biometric authentication systems require a strong privacy guarantee.

Systems exist that attempt to provide strong privacy guarantees for biometric authentication systems. Unfortunately, these systems have numerous deficiencies.

One such system may be referred to as a "feature transformation approach." This system transforms biometric data to random data using a client-specific key or password. However, this approach may not be secure if the client-specific key is compromised.

Another system may be referred to as a "biometric cryptosystem approach." This approach uses a fuzzy vault and a fuzzy commitment scheme. There are also schemes which use secure sketches. These systems may yield transformed biometric templates that do not leak information about the original biometric template. However, these systems are not truly private because the user needs to transmit their untransformed biometric template to the authentication server during the authentication process, thereby leaving the untransformed biometric template at risk of being compromised.

A final system may be referred to as a "homomorphic encryption approach." This approach may attempt to protect a user's biometric template using homomorphic encryption. However, these systems may be deficient because the biometric template may be encrypted using an authenticator's public key. As a result, the raw biometric template may be leaked to the authentication server.

The deficiencies of these and other systems may be overcome by the use of biometric authentication based on error correcting codes. As will be explained in more detail below with reference to FIG. 1A, a biometric authentication system may include a client and an authentication server. The authentication server may provide a biometric authentication service. The authentication server may begin a registration process in which a user of the client registers with the authentication server so that the user may be able to access the biometric authentication service provided by the authentication server. An error correction code ("ECC") and a matrix may be provided to a client device operated by the user. The ECC may be a linear error correcting code scheme or any other error correcting code scheme. A client device of the user receives the ECC and the matrix. The user of the client provides a registration input to the client for a biometric template and a user identifier.

Embodiments of the present invention will be explained with reference to the accompanying drawings.

FIG. 1A is a block diagram of an example biometric authentication system 100, arranged in accordance with at least one embodiment described herein. The biometric authentication system 100 may include a client 102 and an authentication server 140. The client 102 may be accessible by one or more users 106A, 106B (referred to collectively as "user 106" or "users 106"; referred to individually as "user 106A" or "user 106B"). The users 106 may include human users of the client 102, or non-human users having biometric characteristics. The users 106 may use the client 102 to access the authentication server 140. For example, the user 106A may use the client 102 to access a biometric authentication service provided by an authentication module 108 of the authentication server 140. The users 106 may include different humans or the same human accessing the client 102 at different times. As will be explained below, the authentication server 140 may provide the biometric authentication service. The biometric authentication service may be used to determine whether the users 106 are the same person or different people.

The authentication server 140 may include a processor-based computing device. For example, the authentication server 140 may include a hardware server device or any other processor-based computing device configured to function as a server.

The authentication server 140 includes the authentication module 108. The authentication module 108 may include code and routines configured to provide the biometric authentication service. The authentication module 140 may be stored on a memory or other computer-readable medium of the authentication server 140 or that is accessible to the authentication server 140. The authentication module 140 may be executable by a processor of the authentication server 140 to perform one or more of the operations described herein. The authentication module 108 will be described in more detail below with reference to FIGS. 1A-4.

The client 102 may include a processor-based computing device. For example, the client 102 may include a mobile phone, a smartphone, a tablet computer, a laptop computer, a desktop computer, a set-top box, or a connected device (e.g., a smartwatch, smart glasses, a smart pedometer, or any other connected device).

The client 102 may include a client module 110 and one or more sensors 198. The sensor 198 may include a hardware device communicatively coupled to the client 102. Alternatively, the sensor 198 may include a component of the client 102. The client module 110 may include code and routines stored on a memory or other computer-readable medium of the client 102 or that is accessible to the client 102. The client module 110 may be executable by a processor of the client 102 to perform one or more of the operations described herein.

In some embodiments, the authentication module 108 is configured to provide some or all of the functionality of the client module 110. In some embodiments, the authentication module 108 or the client module 110 may be implemented using hardware including a field-programmable gate array (FPGA) or an application-specific integrated circuit (ASIC). In some other instances, the authentication module 108 or the client module 110 may be implemented using a combination of hardware and software. Thus, the authentication module 108 or the client module 110 may be implemented as a hardware device.

The client 102 may include the sensor 198. Although only one sensor 198 is depicted in FIG. 1A, more generally the client 102 may include one or more sensors 198. The sensor 198 may include a hardware device configured to measure one or more biological characteristics of the user 106. The measurements may include biometric measurements. The biometric measurements may describe a unique feature of the user 106. For example, the sensor 198 may include one or more of: a fingerprint scanner; a camera configured to capture an image of an iris; a device configured to measure the DNA of the user 106; a heart rate monitor configured to capture a heart rate of the user 106; a wearable electromyography sensor configured to capture electrical activity produced by the skeletal muscles of the user 106; or any other sensor 198 configured to capture a biometric measurement associated with the user 106.

The client module 110 may include code and routines configured to receive the biometric measurement from the sensor and to determine biometric template data associated with the user 106. The biometric template data may include information describing one or more unique biological characteristics of the user 106. For example, the biometric template data may include a digital reference of one or more unique characteristics included in the biometric measurement.

The biometric authentication service provided by the authentication module 108 may include: (1) a registration process and (2) an authentication process. The registration process for the biometric authentication service provided by the authentication module 108 will now be described according to one embodiment.

With reference to elements 189 and 197 of FIG. 1A, a registration process for the biometric authentication service provided by the authentication module 108 may be initiated. The authentication server 140 may transmit 199 initialization data 197. The initialization data 197 may include an error correction code ("ECC") and a matrix.

The ECC may include a linear error correcting code scheme. The ECC may be represented by the symbol "C" in FIG. 1A.

The matrix may be represented by the symbol "R" in FIG. 1A. The matrix may include a full ranked matrix having any dimension. For example, the matrix may include an arbitrary full ranked (0, 1) matrix of dimension "m×n," where "m<k." Here, the symbol "m" may represent the rows of the matrix, the symbol "n" may represent the columns of the matrix, and the symbol "k" may represent an integer associated with the matrix. The matrix may include a projection matrix.

The client 102 may receive 199 the initialization data 197. The client 102 may also receive 195 a registration input 193 from the user 106. For example, FIG. 1A depicts the client 102 receiving the registration input 193 from the user 106A. The registration input 193 may include an indication of the identity of the user 106. The indication of the identity of the user 106 received 195 during the registration process may be referred to as a "registration user ID." The registration input 193 may also include a biometric template describing a biometric measurement associated with a unique feature of the user 106. The biometric template received 195 during the registration process may be referred to as a "registration biometric template."

The client module 110 may process the registration biometric template using the initialization data 197 to determine a transformed biometric template based on the registration biometric template, the ECC, and/or the matrix. For example, the client module 110 may select a random code word from the ECC. In at least one embodiment, the user 106 may provide an input to the client module 110 to select the random code word from the ECC. In another embodiment, the random code word may be arbitrarily selected from the ECC scheme by the client module 110 or the user 106. The random code word may be represented by the symbol "c" in FIG. 1A (e.g., the symbol "c" in element 189). The client module 110 may use the random code word to generate a transformed biometric template. For example, the client module 110 may use the random code word to generate a one-time pad of the registration biometric template included in the registration input 193. In this way, the registration biometric template used to register the user 106 for the biometric authentication service may be encrypted and not discoverable by anyone who does not know the random code word. The transformed biometric template generated by the client module 110 in the registration process may be referred to as the "transformed registration biometric template."

The client module 110 may also determine a hash of the random code word using the matrix. For example, the matrix may be a projection matrix and the client module 110 uses the projection matrix to determine a hash of the random code word. The hash of the random code word used in the registration process may be referred to as a "hashed registration code word."

The client 102 may transmit 191 registration data 189 to the authentication server 140. The registration data 189 may include one or more of: the transformed registration biometric template; the registration user ID; and the hashed registration code word. Because the random code word may be hashed and the transformed registration biometric template may be a one-time pad of the registration biometric template, the authentication server 140 may have little information regarding the random code word or the registration biometric template of the user 106A. Creating a one-time pad of the registration biometric template using the ECC may include a further benefit of reducing errors caused by noise and other factors when collecting the biometric data.

The authentication module 108 may store the registration data 189 on a memory of the authentication server 140. For example, one or more of the transformed registration biometric template and the hashed registration code word may be associated with the registration user ID and stored on a memory of the authentication server 140.

The authentication process for the biometric authentication service provided by the authentication module 108 will now be described according to one embodiment.

The client 102 may receive 187 an authentication input 185. For example, the client 102 receives 187 the authentication input 185 from the user 106B purporting to have the identity of the user 106A. The user 106A may be registered with the authentication service provided by the authentication module 108, as already described. The biometric authentication service may be configured to determine whether the user 106B associated with the authentication input 185 is the same as the user 106A associated with the registration input 193.

The authentication input 185 provided by the user 106B may include an indication of the identity for the user 106B and a biometric template describing a unique biological characteristic of the user 106B. The indication of the identity of the user 106B received 187 during the authentication process may be referred to as an "authentication user ID." Similarly, the biometric data received 187 during the authentication process may be referred to as "authentication biometric template."

The client module 110 may process the authentication biometric template using the initialization data 197 to determine a transformed biometric template based on the authentication biometric template, the ECC, and/or the matrix. For example, the client module 110 selects a random code word from the ECC. In at least one embodiment, the user 106 may provide an input to the client module 110 to select the random code word from the ECC. In another embodiment, the random code word may be arbitrarily selected from the ECC by the client module 110 or the user 106. The random code word selected in the authentication process may be represented by the symbol "c'" in FIG. 1A (e.g., the symbol "c'" in element 181). The client module 110 may use the random code word to generate a transformed biometric template. For example, the client module 110 may use the random code word to generate a one-time pad of the authentication biometric template included in the authentication input 185. The transformed biometric template generated by the client module 110 in the authentication process may be referred to as the "transformed authentication biometric template." The client module 110 may also determine a hash of the random code word using the matrix. The hash of the random code word used in the authentication process may be referred to as a "hashed authentication code word."

The client 102 may transmit 183 authentication data 181 to the authentication server 140. The authentication data 181 may include one or more of: the transformed authentication biometric template; the authentication user ID; and the hashed authentication code word.

The authentication module 108 may store the authentication data 181 on a memory of the authentication server 140. The authentication module 108 may analyze the authentication data 181 to determine if it matches or approximately matches the registration data 189 stored by the authentication server 140.

In some embodiments, the match between the transformed authentication biometric template and the transformed registration biometric template does not have to be exact in order for the authentication module 108 to authenticate the user 106 that submitted the authentication input 185. For example, the authentication module 108 may be configured to require that one or more components of the transformed authentication biometric template match one or more components of the transformed registration biometric template within a predetermined tolerance. An example is described below with reference to FIG. 1B.

The authentication server 140 may transmit 179 an authentication decision 177 to the client 102 indicating whether the user 106B is authenticated.

Figure 1B:
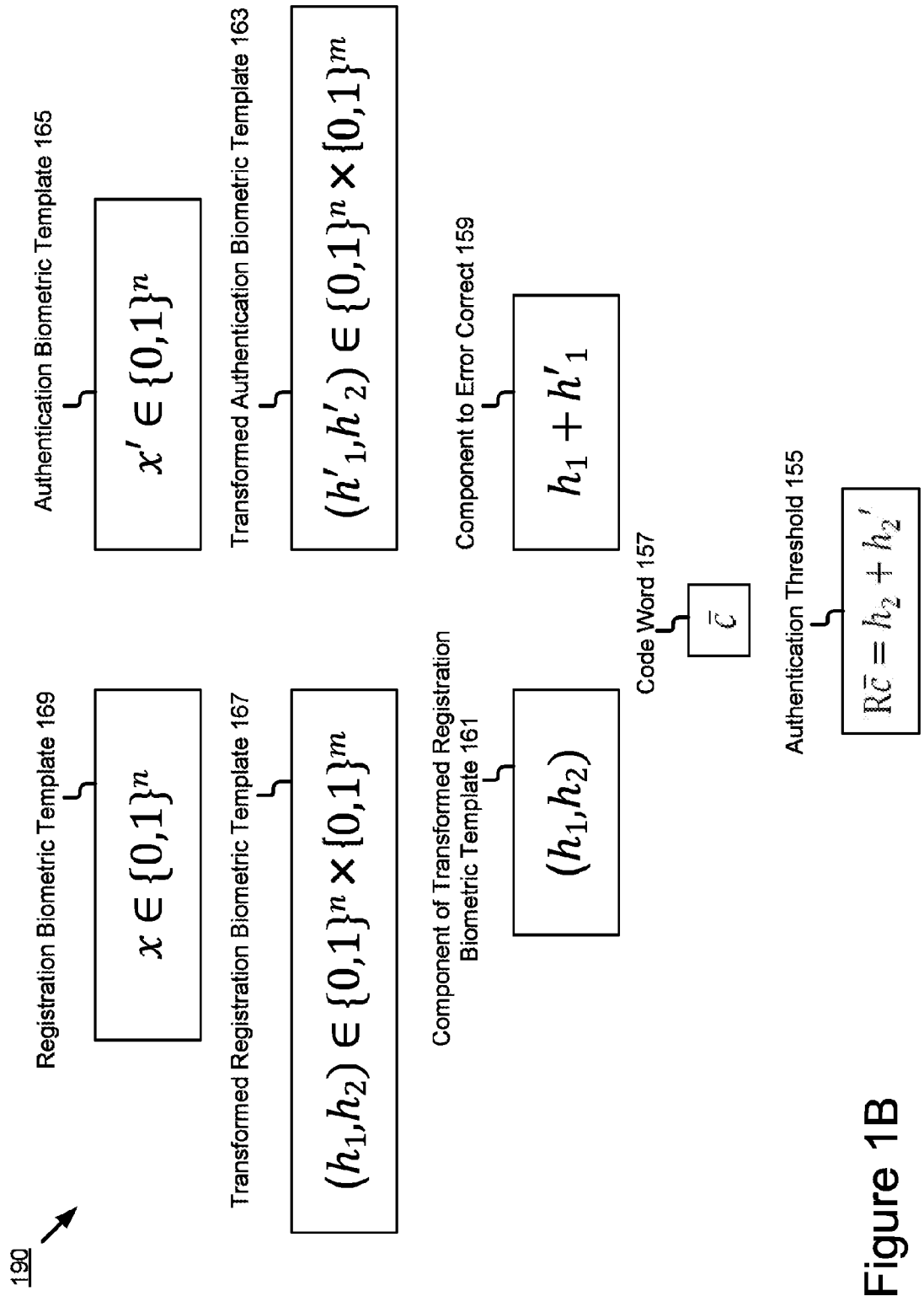
FIG. 1B is a block diagram of example data used to authenticate a user.

FIG. 1B is a block diagram of example data 190 used to authenticate a user. FIG. 1B will be described with reference to FIG. 1A.

Element 169 may be an example of a registration biometric template received in the registration process. For example, the client 102 receives 195 the registration input 193 that includes a registration biometric template 169.

FIG. 1B depicts various symbols. In some implementations, the symbol "n" may represent a length of a biometric template in bits. The symbol "x" may represent an n bit biometric template measured during a registration phase. The symbol "x'" may represent an n bit biometric template measured during an authentication phase. The symbol "$h_1$" may represent a transformed version of "x" after applying a one-time pad, via any random code word represented by the symbol "c". The symbol "$h_2$" may represent a hash of the random code word represented by the symbol "c". The symbol "m" may represent a bit length of the hash of the random code word represented by the symbol "c". In some implementations, the symbol "$h'_1$" may represent a transformed version of "x'" after applying a one-time pad, via any random code word represented by the symbol "c'". The symbol "h'₂" may represent a hash of the random code word represented by the symbol "c'".

Element 167 may be an example of a transformed registration biometric template. For example, the client module 110 determines a transformed registration biometric template 167 based on one or more of the ECC and the matrix received 199 in the initialization data 197. The client 102 may transmit 191 the transformed registration biometric template 167 to the authentication server 140 along with a registration user ID. The authentication server 140 may store the transformed registration biometric template 167 along with an associated registration user ID corresponding to the user 106A that submitted 195 the registration input 193. Element 165 may be an example of an authentication biometric template 165 received in the authentication process. For example, the client 102 receives 187 the authentication input 185 that includes the authentication biometric template 165.

Element 163 may be an example of a transformed authentication biometric template. For example, the client module 110 determines the transformed registration biometric template 167 based on one or more of the ECC and the matrix received 199 in the initialization data 197. The client 102 may transmit 183 a transformed authentication biometric template 163 to the authentication server 140 along with an authentication user ID for a second user 106B purporting to have the identity of a first user 106A.

The authentication module 108 may analyze the transformed authentication biometric template 163 in order to attempt to authenticate the identity of the user 106B. For example, the authentication module 108 may retrieve element 161 from storage. The element 161 may be a component of the transformed registration biometric template. For example, the element 161 may be associated with a registered user 106A. The authentication module 108 may access the element 161 and the transformed authentication biometric template 163 to form element 159. The element 159 may include components of the transformed registration biometric template 167 and the transformed authentication biometric template 163. The authentication module 108 may error correct the element 159 to determine a code word 157. The authentication module 108 may authenticate the user 106B associated with the transformed authentication biometric template 163 as having the same identity as the user 106A associated with the transformed registration biometric template 167 if an authentication threshold 155 is met.

Figure 1C:
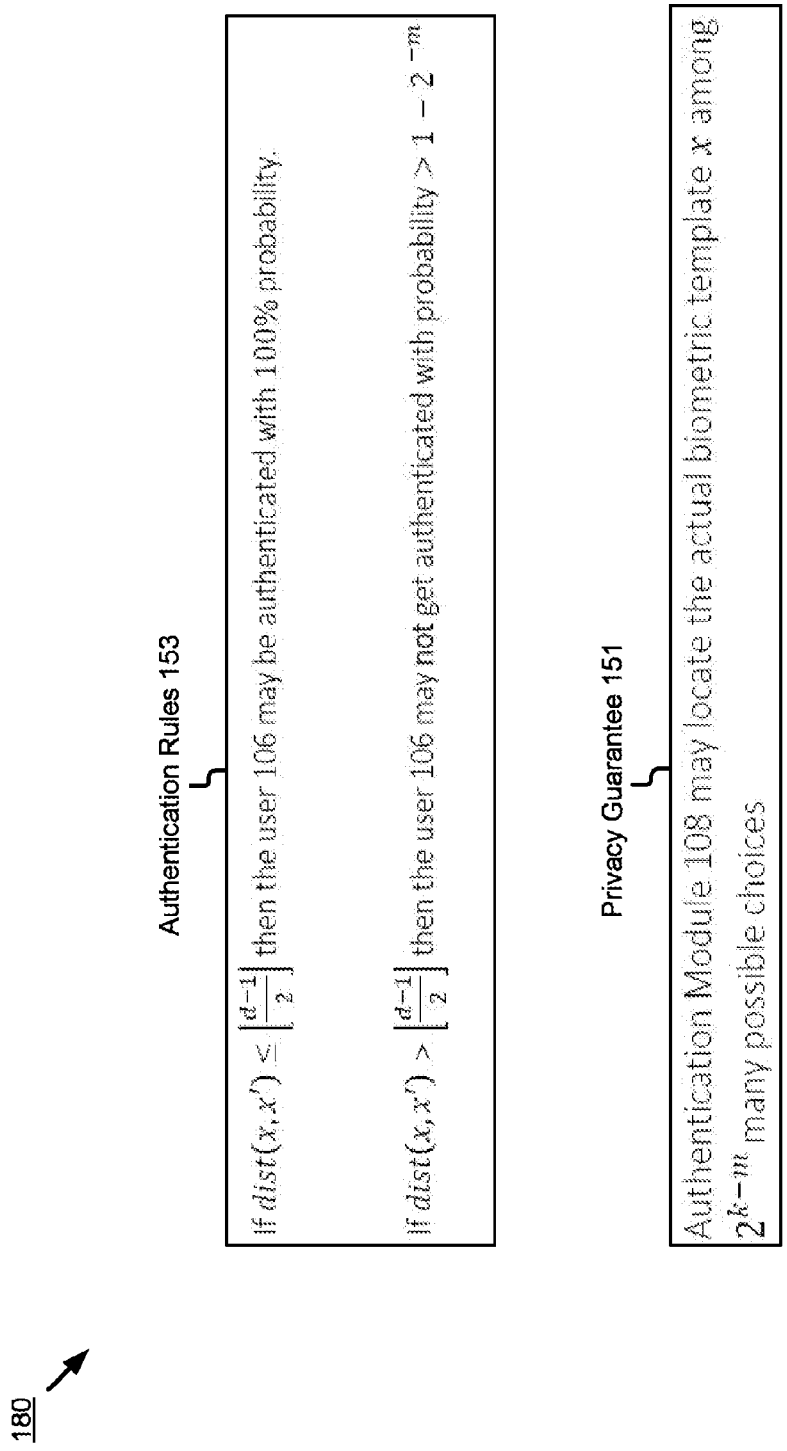
FIG. 1C is a block diagram of example authentication rules and privacy guarantees provided by an example biometric authentication system.

FIG. 1C is a block diagram of example authentication rules and privacy guarantees 180 provided by an example biometric authentication system, such as the biometric authentication system 100 of FIG. 1A. Element 153 includes an example of a set of authentication rules 153 used by the authentication module 108 to authenticate users of the biometric authentication system. Element 151 includes an example of a privacy guarantee provided by the biometric authentication system.

FIG. 1C depicts various symbols. In some implementations, the symbol "n" may represent a length of a biometric template in bits. The symbol "x" may represent an n bit biometric template measured during a registration phase. The symbol "(d−1)/2" may represent a threshold of a biometric scheme in which a user is authenticated if and only if the distance between their biometric templates during registration and authentication are less than "(d−1)/2". The symbol "m" may represent a bit length of the hash of the random code word represented by the symbol "c".

In some implementations, the symbol "(d−1)/2" may be an error correction capacity of a linear error correcting code represented by "C" (note the letter "C" here is capitalized, and therefore may distinguished from the random code word represented by the lower-case letter "c"). In some implementations, "(d−1)" may represent the error detection capacity of the linear error correcting code represented by "C". The symbol "k" may represent a parameter of the linear error correcting code represented by "C". For example, the encoding function of the linear error correcting code represented by "C" may take a "k" bit message and output an "n" bit code word "c".

FIG. 1D is a block diagram of an example operating environment 160 in which a client module or authentication module may be implemented to provide biometric authentication based on error correction codes. The illustrated operating environment 160 includes the client 102, the client module 110, the user 106, the authentication server 140, the authentication module 108, and a network 107.

Although FIG. 1B illustrates one network 107 communicatively coupled to the client 102 and the authentication server 140, in practice one or more networks 107 may be communicatively coupled to these entities.

The network 107 may include a conventional type network, a wired or wireless network, and/or may have numerous different configurations including a star configuration, token ring configuration, or other configurations. Furthermore, the network 107 may include a local area network (LAN), a wide area network (WAN) (e.g., the Internet), and/or other interconnected data paths across which multiple devices may communicate. In some instances, the network 107 may include a peer-to-peer network. The network 107 may also be coupled to or include portions of a telecommunications network for sending data in a variety of different communication protocols. In some instances, the network 107 includes Bluetooth communication networks or a cellular communications network for sending and receiving data including via short messaging service (SMS), multimedia messaging service (MMS), hypertext transfer protocol (HTTP), direct data connection, WAP, e-mail, etc.

The client 102, the client module 110, the user 106, the authentication server 140, and the authentication module 108 may be the same as those described with respect to FIGS. 1A, 1B, and 1C, and so, these descriptions will not be repeated here. With combined reference to FIGS. 1A-1D, the client 102 may transmit the registration data 189 and the authentication data 181 to the authentication server 140 via the network 107. Similarly, the authentication server 140 may transmit the initialization data 197 and the authentication decision 177 to the client 102 via the network 107.

Figure 2:
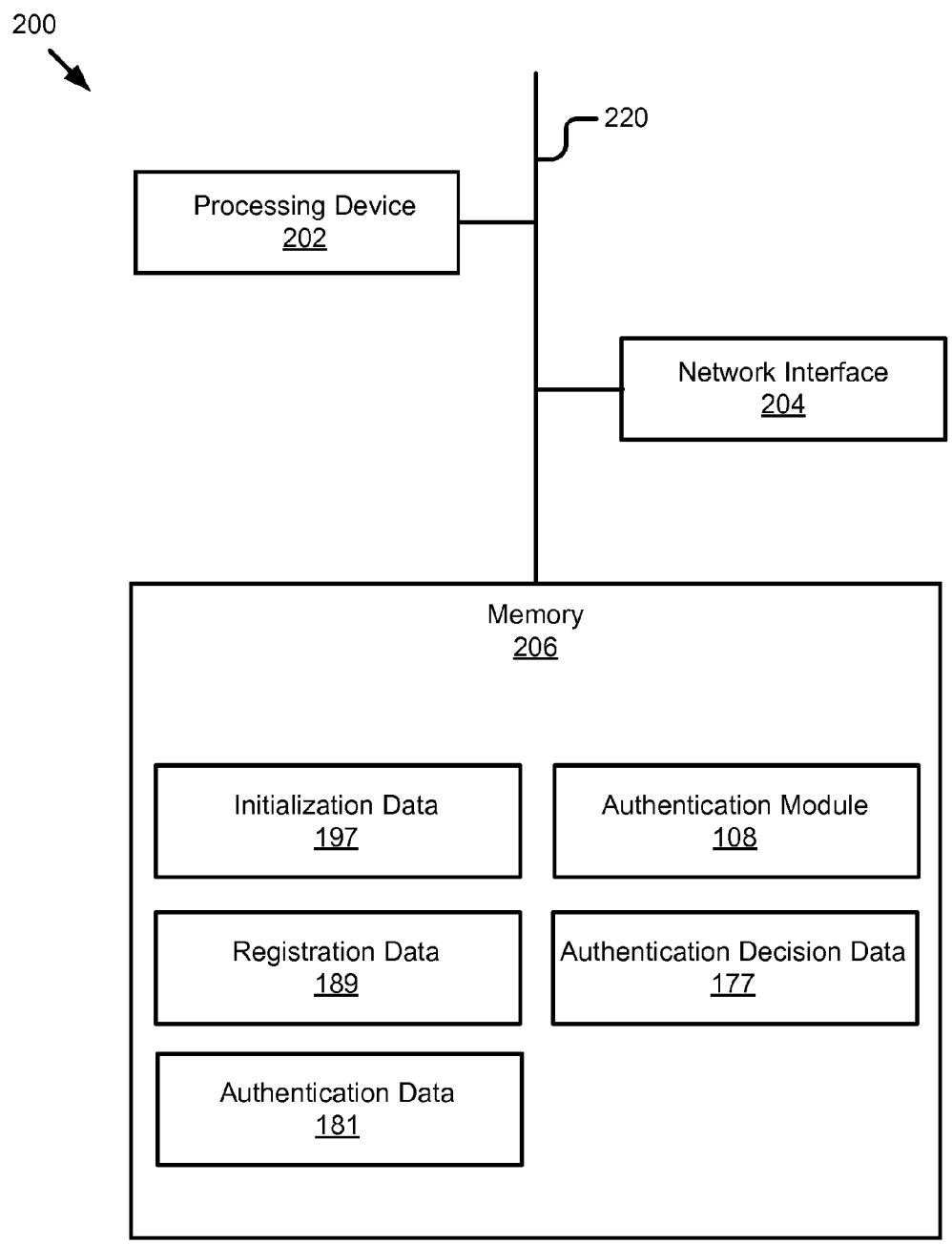
FIG. 2 is a block diagram of an example system for providing biometric authentication based on error correcting codes.

FIG. 2 is a block diagram of an example system 200 for providing biometric authentication based on error correcting codes, arranged in accordance with at least one embodiment described herein. The system 200 of FIG. 2 may be an example of the authentication server 140 described above with reference to FIGS. 1A-1D.

The system 200 may include a processing device 202, a network interface 204, and a memory 206. The various components of the system 200 may be communicatively coupled to one another via a bus 220.

The processing device 202 may include an arithmetic logic unit, a microprocessor, a general-purpose controller, or some other processor array to perform computations and provide electronic display signals to a display device. The processing device 202 processes data signals and may include various computing architectures including a complex instruction set computer (CISC) architecture, a reduced instruction set computer (RISC) architecture, or an architecture implementing a combination of instruction sets. Although FIG. 2 includes a single processing device 202, multiple processing devices 202 may be included. Other processors, operating systems, sensors, displays, and physical configurations are possible.

The network interface 204 may include hardware for enabling the system 200 to communicate with or through the network 107 of FIG. 1D. The network interface 204 may include codes and routines configured to enable the network interface 204 to provide its functionality.

The memory 206 may store instructions and/or data that may be executed by the processing device 202. The instructions and/or data may include code for performing the techniques described herein. The memory 206 may include a dynamic random access memory (DRAM) device, a static random access memory (SRAM) device, flash memory, or some other memory device. In some instances, the memory 206 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the depicted embodiment, the memory 206 may store the authentication module 108, the initialization data 197, the registration data 189, the authentication data 181, and the authentication decision data 177. These components of the system 200 were described above with reference to FIGS. 1A and 1B, and so, these descriptions will not be repeated here.

Figure 3:
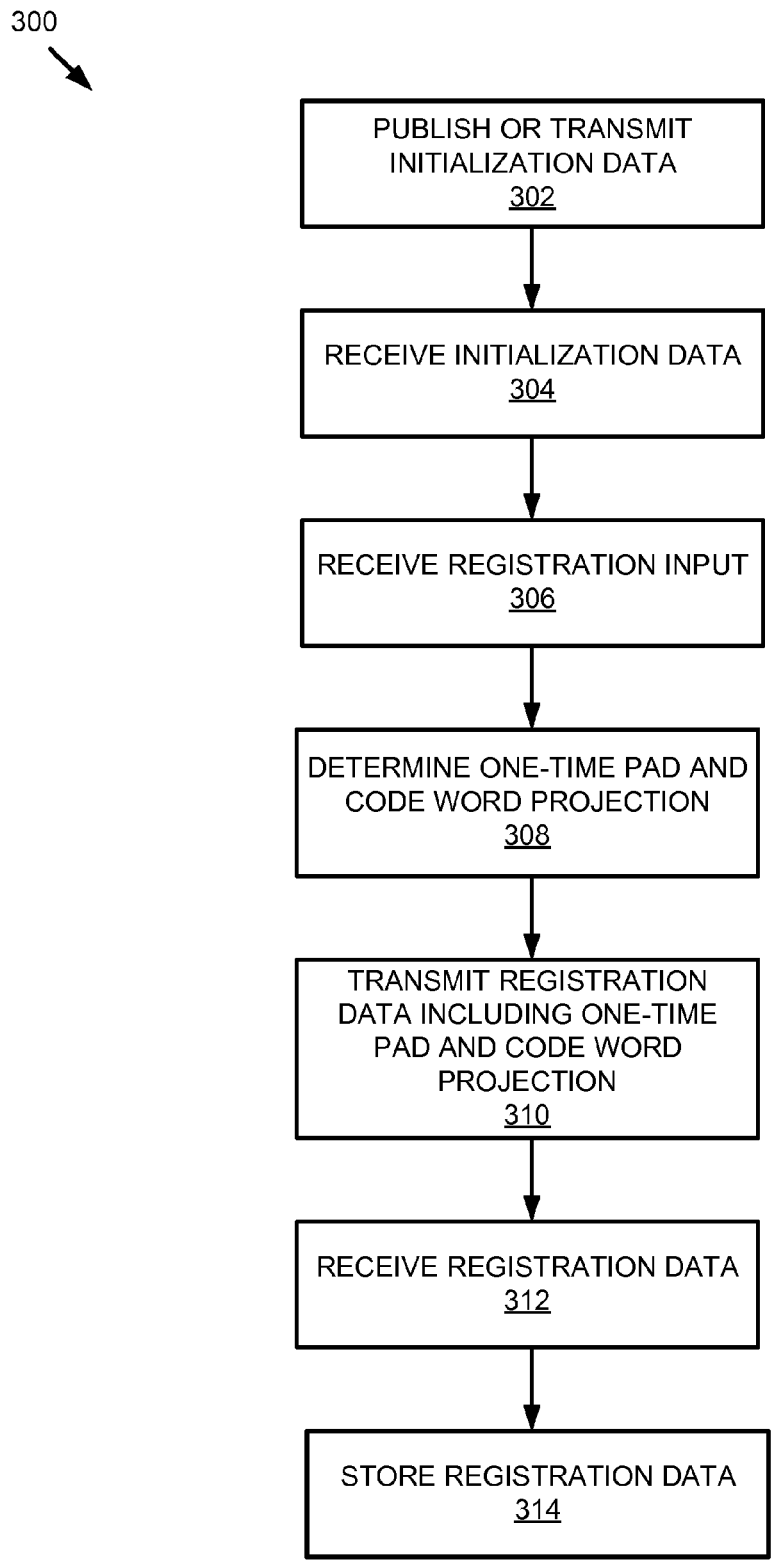
FIG. 3 shows an example flow diagram of a method of registering a user for biometric authentication based on error correction codes.

FIG. 3 shows an example flow diagram of a method 300 of registering a user for biometric authentication based on error correction codes, arranged in accordance with at least one embodiment described herein. The method 300 in some embodiments may be performed, in whole or in part, by a system such as the biometric authentication system 100 of FIG. 1A and/or the system 200 of FIG. 2. For instance, the processing device 202 of FIG. 2 may be configured to execute computer instructions stored on the memory 206 to perform functions and operations as represented by one or more of the blocks of the method 300 of FIG. 3. Although illustrated as discrete blocks, various blocks may be divided into additional blocks, combined into fewer blocks, or eliminated, depending on the desired implementation. The method 300 may be described with reference to FIG. 1A, 1B, 1D, or 2.

The method 300 may begin at block 302. At block 302, initialization data may be published or transmitted. For example, the authentication module 108 may transmit the initialization data to the client 102 via the network 107. At block 304, the initialization data 197 may be received. For example, the client 102 may receive the initialization data 197. The initialization data 197 may include an ECC and a matrix. At block 306, the registration input 193 may be received. For example, the client module 110 may receive the registration input 193 from the user 106A. The registration input 193 may include a registration biometric template and a registration user ID.

At block 308, a one-time pad and code word projection may be calculated. For example, the client module 110 may determine a one-time pad of the registration biometric template 169 to form the transformed registration biometric template 167. The client module 110 may also determine a hash of a code word used during the registration process. The client module 110 may determine the hash of the code word using a projection matrix to form a hashed registration code word.

The transformed registration biometric template 167 and the hashed registration code word may be included in a set of registration data 189 along with a registration user ID. At block 310 the registration data 189 may be transmitted. For example, the registration data 189 may be transmitted by the client module 110. At block 312 the registration data 189 may be received. For example, the authentication module 108 may receive the registration data 189. At block 314 the registration data 189 may be stored on a memory. For example, the authentication module 108 may store the registration data 189 on the memory 206.

Some embodiments described herein include a non-transitory computer-readable medium having computer instructions stored thereon that are executable by a processing device to perform one or more of the operations included in the method 300 of FIG. 3, such as the operations illustrated by blocks 302, 304, 306, 308, 310, 312, or 314 in FIG. 3, or variations thereof. The non-transitory computer-readable medium may include the memory 206 of FIG. 2, for example. The processing device may include the processing device 202 of FIG. 2, for example.

Figure 4:
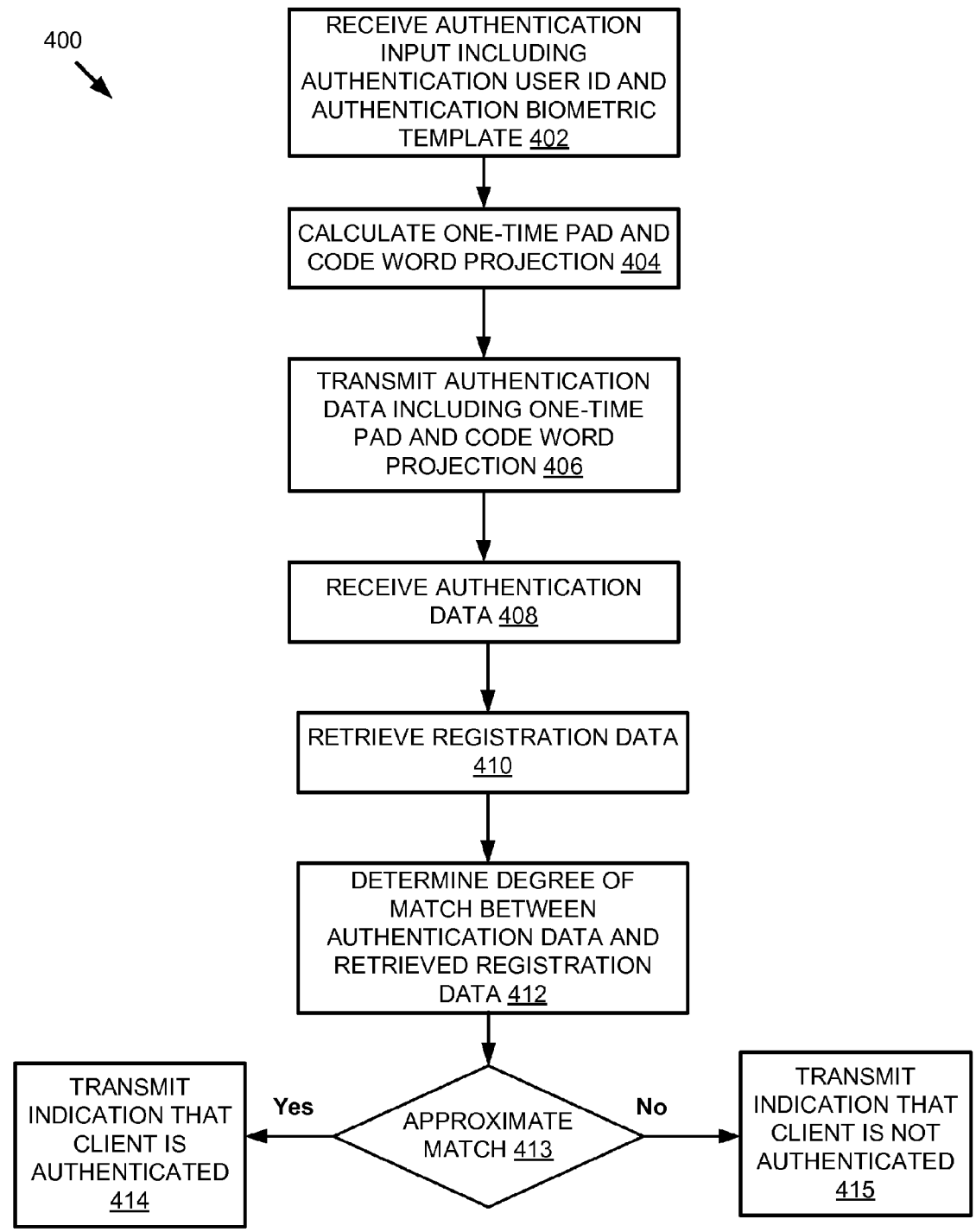
FIG. 4 shows an example flow diagram of a method of providing biometric authentication for a user based on error correction codes.

FIG. 4 shows an example flow diagram of a method 400 of providing biometric authentication for a user based on error correction codes, arranged in accordance with at least one embodiment described herein. At block 402 the authentication input 185 may be received. For example, the client 102 receives the authentication input 185 from the user 106B purporting to have the identity of the user 106A as depicted in FIG. 1A. The user 106A may be registered with the authentication service provided by the authentication module 108, for example, according to the method 300 described above for FIG. 3. The method 400 of FIG. 4 may be configured to determine whether the user 106B associated with the authentication input 185 may be the same as the user 106A associated with the registration input 193.

The authentication input 185 provided by the user 106B may include an authentication user ID and an authentication biometric template. At block 404 a one-time pad and code word projection are calculated. For example, the client module 110 determines a one-time pad of the authentication biometric template 165 to form the transformed authentication biometric template 163. The client module 110 may also determine a hash of a code word used during the authentication process. The client module 110 may determine the hash of the code word using a projection matrix to form a hashed authentication code word.

The transformed authentication biometric template 163 and the hashed authentication code word may be included in a set of authentication data 181 along with an authentication user ID. At block 406 the authentication data 181 may be transmitted. For example, the authentication data 181 may be transmitted by the client module 110. At block 408 the authentication data 181 may be received. For example, the authentication module 108 may receive the authentication data 181.

At block 410 the registration data 189 may be retrieved from memory. For example, the authentication module 108 may select the authentication user ID from the authentication data 181. The authentication user ID may correspond to a registration user ID stored in the memory 206. The authentication module 108 may determine whether a registration user ID stored in memory corresponds to the authentication user ID. The authentication module 108 may then retrieve registration data that may be associated with the registration user ID that corresponds to the authentication user ID. The retrieved registration data may include a component of a transformed registration biometric template such as described above for the element 161 of FIG. 1B.

At block 412 a degree of matching may be determined between the authentication data received at block 408 and the registration data retrieved at block 412. For example, the authentication module 108 determines whether the authentication threshold 155 has been satisfied as described above with reference to FIG. 1B. At block 413 a determination may be made regarding whether an approximate match may be present among the authentication data received at block 408 and the registration data retrieved at block 412. The determination of block 413 may be made by the authentication module 108 in accordance with the authentication rules 153 or a privacy guarantee 151 described above with reference to FIG. 1C.

If an approximate match may be determined to be present at block 413, then at block 414 a positive indication that the client is authenticated may be transmitted. For example, the authentication module 108 may transmit 179 the authentication decision 177 indicating that the user 106B is authenticated.

If an approximate match is determined not to be present at block 415, then at block 414 a negative indication that the client is not authenticated may be transmitted. For example, the authentication module 108 may transmit 179 the authentication decision 177 indicating that the user 106B is not authenticated.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of authentication using biometric data, the method comprising:
   transmitting, from an authentication device, an error correction code scheme to a first device, the first device configured to receive first biometric data of a user;
   obtaining, at the authentication device, registration data from the first device, the registration data including first encoded biometric data, the first encoded biometric data including the first biometric data received by the first device encoded with a first error correction code selected from the error correction code scheme;
   after obtaining the registration data, obtaining, at the authentication device, authentication data from the first device that includes second encoded biometric data, the second encoded biometric data including second biometric data of the user obtained at the first device that is encoded with a second error correction code selected from the error correction code scheme; and
   authenticating, at the authentication device, the first device based on a relationship between the registration data and the authentication data.

2. The method of claim 1, wherein the error correction code scheme comprises a linear error correction code scheme.

3. The method of claim 1, further comprising
   transmitting, from the authentication device, a hashing matrix to the first device,
   wherein
      the registration data includes a first hashed code that is generated by hashing the first error correction code using the hashing matrix, and
      the authentication data includes a second hashed code that is generated by hashing the second error correction code using the hashing matrix.

4. The method of claim 1, wherein the authenticating is performed at the authentication device without the authentication device obtaining an original version or a decoded version of either the first biometric data or the second biometric data.

5. The method of claim 3, wherein authenticating the first device includes:

obtaining a third error correction code using the first encoded biometric data and the second encoded biometric data;

comparing the first hashed code and the second hashed code with respect to the hashing matrix and the third error correction code; and authenticating the first device based on the comparison.

6. The method of claim 1, wherein a degree of probability of a correct authentication is based on a relationship between a distance between the first biometric data and the second biometric data and an error correction capacity of the error correction code scheme.

7. A system comprising:

a processor; and a memory communicatively coupled to the processor and storing instructions that, when executed by the processor, cause the system to:

transmit, from an authentication device, an error correction code scheme to a first device, the first device configured to receive first biometric data of a user;

obtain, at the authentication device, registration data from the first device, the registration data including first encoded biometric data, the first encoded biometric data including the first biometric data received by the first device encoded with a first error correction code selected from the error correction code scheme;

after the registration data is obtained, obtain, at the authentication device, authentication data from the first device that includes second encoded biometric data, the second encoded biometric data including second biometric data of the user obtained at the first device that is encoded with a second error correction code selected from the error correction code scheme; and authenticate, at the authentication device, the first device based on a relationship between the registration data and the authentication data.

8. The system of claim 7, wherein the error correction code scheme comprises a linear error correction code scheme.

9. The system of claim 7, wherein the instructions further cause the system to:

transmit, from the authentication device, a hashing matrix to the first device, wherein the registration data includes a first hashed code that is generated by hashing the first error correction code using the hashing matrix, and the authentication data includes a second hashed code that is generated by hashing the second error correction code using the hashing matrix.

10. The system of claim 7, wherein the authentication is performed at the authentication device without the authentication device obtaining an original version or a decoded version of either the first biometric data or the second biometric data.

11. The system of claim 9, wherein the system performs the following during authentication of the first device:

obtain a third error correction code using the first encoded biometric data and the second encoded biometric data, compare the first hashed code and the second hashed code with respect to the hashing matrix and the third error correction code; and authenticate the first device based on the comparison.

12. The system of claim 7, wherein a degree of probability of a correct authentication is based on a relationship between a distance between the first biometric data and the second biometric data and an error correction capacity of the error correction code scheme.

13. A method comprising:

receiving, at client device from an authentication device, initialization data including an error correction code and a matrix;

obtaining, at the client device, a registration input including one or more of: a registration biometric template and a registration user identifier, the registration biometric template describing one or more unique characteristics of a first user that are identified by the registration user identifier;

determining a registration code word based on the error correction code;

determining a transformed registration biometric template by transforming the registration biometric template using the registration code word;

hashing the registration code word using the matrix to form a hashed registration code word; and transmitting, from the client device to the authentication device, registration data including one or more of the transformed registration biometric template, the hashed registration code word, and the registration user identifier, wherein the authentication device authenticates the client device based on the registration data without the authentication device obtaining an original version or a decoded version of the registration biometric template.

14. The method of claim 13, wherein the error correction code comprises a linear error correction code.

15. The method of claim 13, wherein the transformed registration biometric template comprises a one-time pad of the registration biometric template describing biometric data of the first user.

16. The method of claim 13, further comprising:

receiving an authentication input including one or more of an authentication biometric template and an authentication user identifier, the authentication biometric template describing one or more unique characteristics of a second user that are identified by the authentication user identifier, the authentication user identifier indicating that the second user purports to be the first user;

determining an authentication code word based on the error correction code;

determining a transformed authentication biometric template based on the authentication biometric template and the authentication code word; and hashing the authentication code word using the matrix to form a hashed authentication code word.

17. The method of claim 16, further comprising transmitting authentication data to the authentication device including one or more of: the transformed authentication biometric template, the hashed authentication code word, and the authentication user identifier.

18. The method of claim 16, wherein the matrix comprises a full ranked (0,1) matrix configured to determine the hashed registration code word and the hashed authentication code word.

19. The method of claim 16, wherein the transformed authentication biometric template comprises a one-time pad of the authentication biometric template describing biometric data for the second user.

* * * * *